July 25, 1950

H. L. BOWERS ET AL 2,516,671

JET POWER UNIT MOUNTING

Filed March 21, 1946

INVENTORS
*Herbert L. Bowers*
BY *Robert A. Wolf*
*Beau, Brooks, Buckley & Beau*
ATTORNEYS July 25, 1950

H. L. BOWERS ET AL 2,516,671

JET POWER UNIT MOUNTING

Filed March 21, 1946

INVENTORS
Herbert L. Bowers
BY Robert A. Wolf
Bean, Brooks, Buckley & Bean.
ATTORNEYS Patented July 25, 1950

2,516,671

UNITED STATES PATENT OFFICE 2,516,671

JET POWER UNIT MOUNTING

Herbert L. Bowers and Robert A. Wolf, Kenmore, N. Y., assignors to Bell Aircraft Corporation, Wheatfield, N. Y.

Application March 21, 1946, Serial No. 656,015

2 Claims. (Cl. 244—54)

This invention relates to a new and practical type of airplane construction, wherein power is supplied by two or more power units of the jet propulsion type.

Our efforts have been directed toward the following advancements which constitute the purposes of the invention:

To construct an airplane of the type described having a great reduction in the spanwise moment of inertia, resulting in improved control and decreasing the necessary area of the control surfaces. This, in turn, lessens the spin hazard and saves considerable weight.

To reduce the frontal area of the airplane and much of the attendant parasitic drag, without loss of power unit efficiency, and, thereby to increase the speed and general performance of the airplane.

To install power units of the type described in close-coupled arrangement within nacelles formed as one structural element, in a way to permit shorter, and therefore more efficient installation of the particular fuel system and power plant controls necessary for operation of an airplane of this type.

A further purpose of this invention is to provide a close-coupled installation of two or more jet propulsion units, in such a manner that balanced air pressure and free airflow intercommunication exists between the power unit compartments or nacelles. Since these nacelles must be pressurized or sealed at all joints to withhold a predetermined air pressure, airflow and balance between them is a most desirable condition, particularly in instances of yaw and sideslip, when the airplane is being flown.

Other purposes of the general arrangement are to provide maximum aerodynamic streamlining and fairing, minimum obstruction to pilot's vision; greater gunfire protection for the pilot and many other advantages which will be more apparent from an examination of the following specification, claims, and accompanying drawings in which:

Figure 7 is an enlarged transverse fragmentary view of Figure 4 to illustrate the power unit supports and other structural elements.

While a multiple power unit embodiment of this invention is shown and described, the major part of the description has been limited to the two power unit type.

Figure 1:
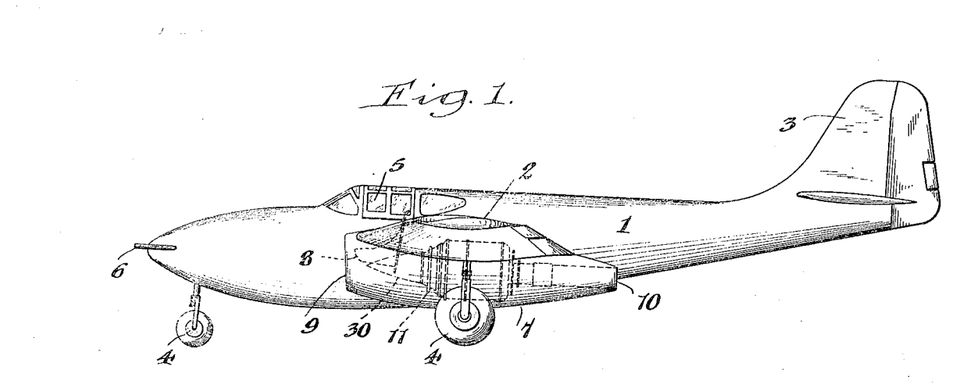
Figure 1 is a side elevational view of an airplane of the invention having two jet propulsion units.
Figure 2:
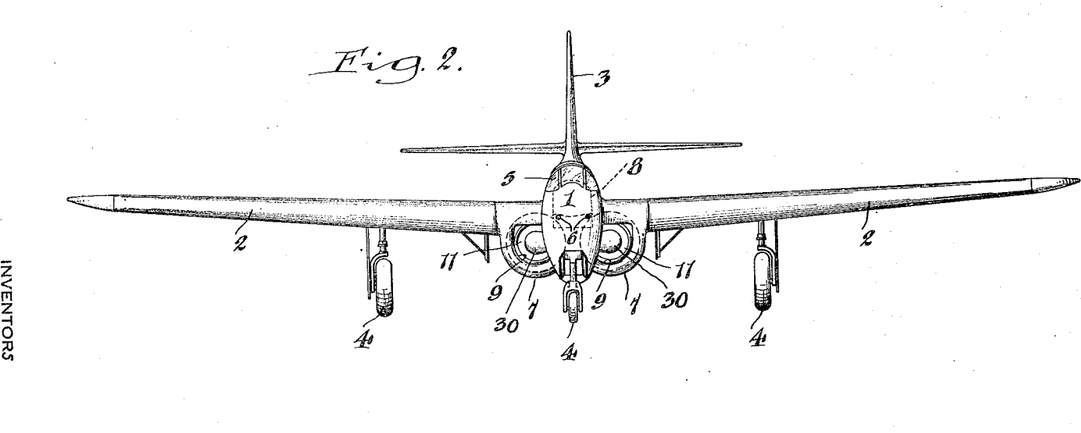
Figure 2 is a front elevational view of the airplane described in Figure 1.
Figure 3:
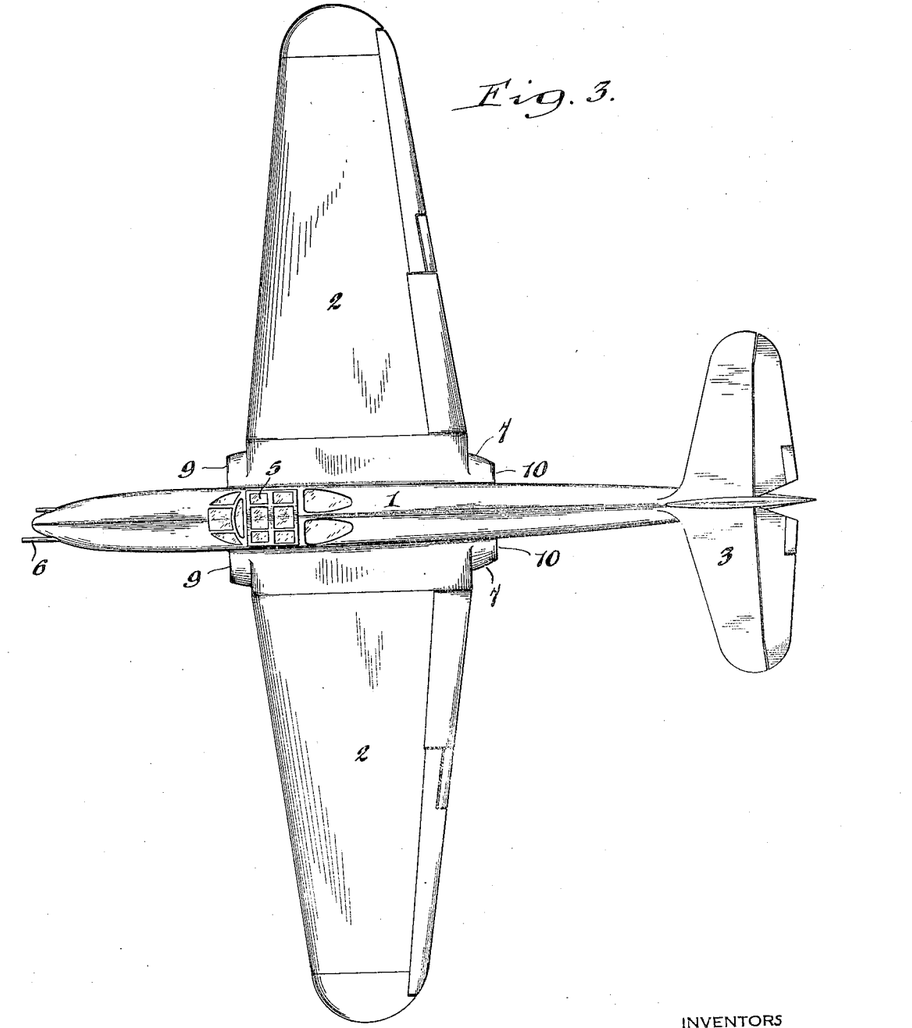
Figure 3 is a top plan view of the airplane described in Figures 1 and 2.

This invention contemplates an airplane structure of outward appearance as seen in Figures 1, 2 and 3, comprising a fuselage 1, wings 2, tail section 3, tricycle landing gear 4, pilot's cabin 5 and in which armament may be installed as at 6. The airplane described has two nacelles 7 installed as one structural element in the center section, carrying jet propulsion power units 11, as seen by the broken lines in Figures 1 and 2. The relative position of one of these units 11 to the pilot's seat 8 is indicated by the broken lines in both Figures 1 and 2. It will be noted that this airplane, using shortened tricycle landing gear is extremely close to the ground, thus making it possible to obtain increased lift on takeoff. The shortened landing gear likewise saves weight and space.

It will readily be seen in Figures 1 through 3 that both power units are within close-coupled nacelles 7 which are recessed into the fuselage 1 and wings 2. Each nacelle has an induction port 9 and propulsion vent 10.

Referring now to Figures 4, 5, 6 and 7: The power units 11 are mounted within nacelles 7 which are open and smoothly turned at their forward ends to form the induction ports 9. Each power unit is shown with normal accessories such as: starter, generator, pumps, etc., installed and grouped at the forward end, as indicated about 12. Both power units are supported at the rear by an upper support fitting 13, a lower fitting 14 and a forward adjustable support 15. The power unit nacelles are installed within the center section of the airplane, the main support of which, in this instance, is a girder 16, having chord members 17, diagonal braces 18 and vertical braces 19. It will be seen in Figures 4 and 7 that the girder 16 is constructed in two sections which are bolted together at the center by the use of the fittings 20 and the fitting bolts 20a.

Fuel is stored in the fuel tanks 21 (located in the outer wing panels 22, which are joined to the center section at 22a) and suitably carried to the units by the plumbing 23.

Figure 4:
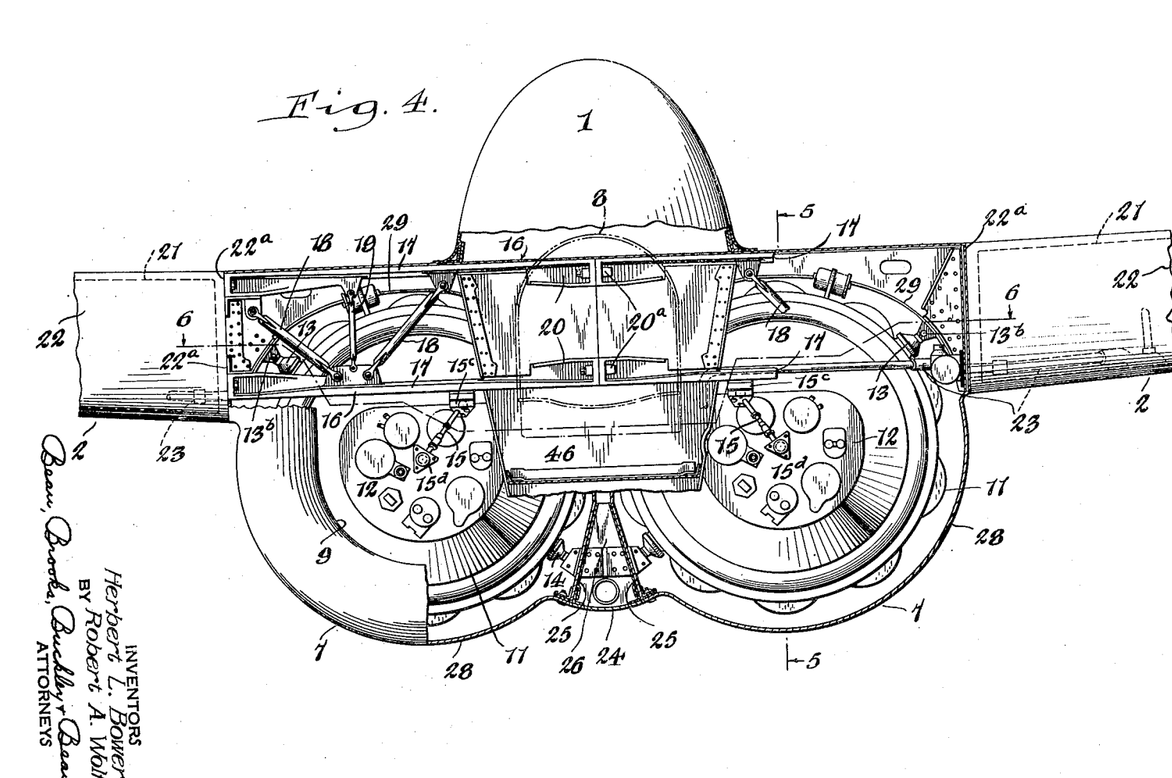
Figure 4 is a front transverse view through the airplane body and both power unit nacelles, showing a portion of one nacelles' forward end.
Figure 6:
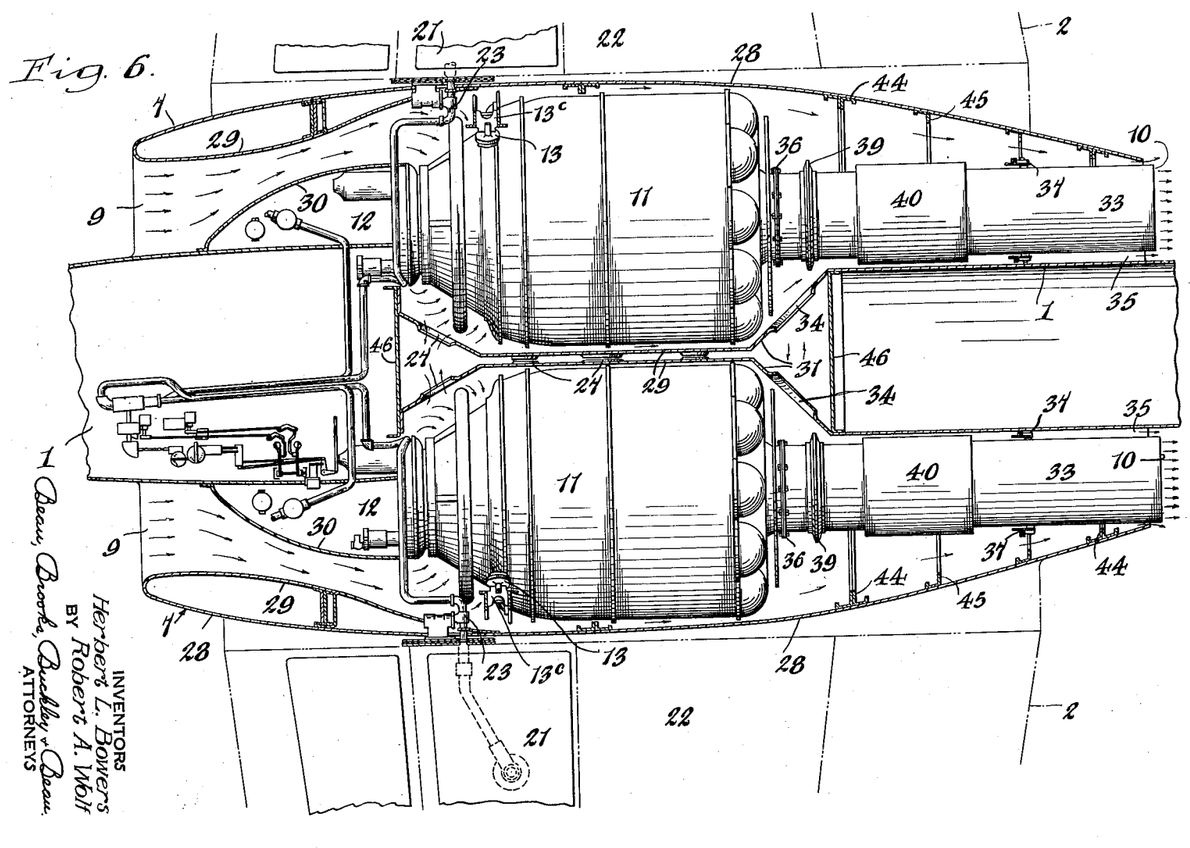
Figure 6 is a horizontal section through the fuselage and two power unit nacelles taken along the line 6—6 in Figure 4.

The power unit nacelles 7 as formed into a single structural unit are further illustrated in Figures 4, 6 and 7. Here it is seen that the nacelles, suitably attached to the center section and recessed into the fuselage, are unified by means of the nacelle joiner portion 24, as seen in Figures 4 and 7. This is retained in place by the structural partitions 25 which are joined to the inner nacelle walls and nacelle joiner portion 24 by the bracket plates 26.

Figure 5:
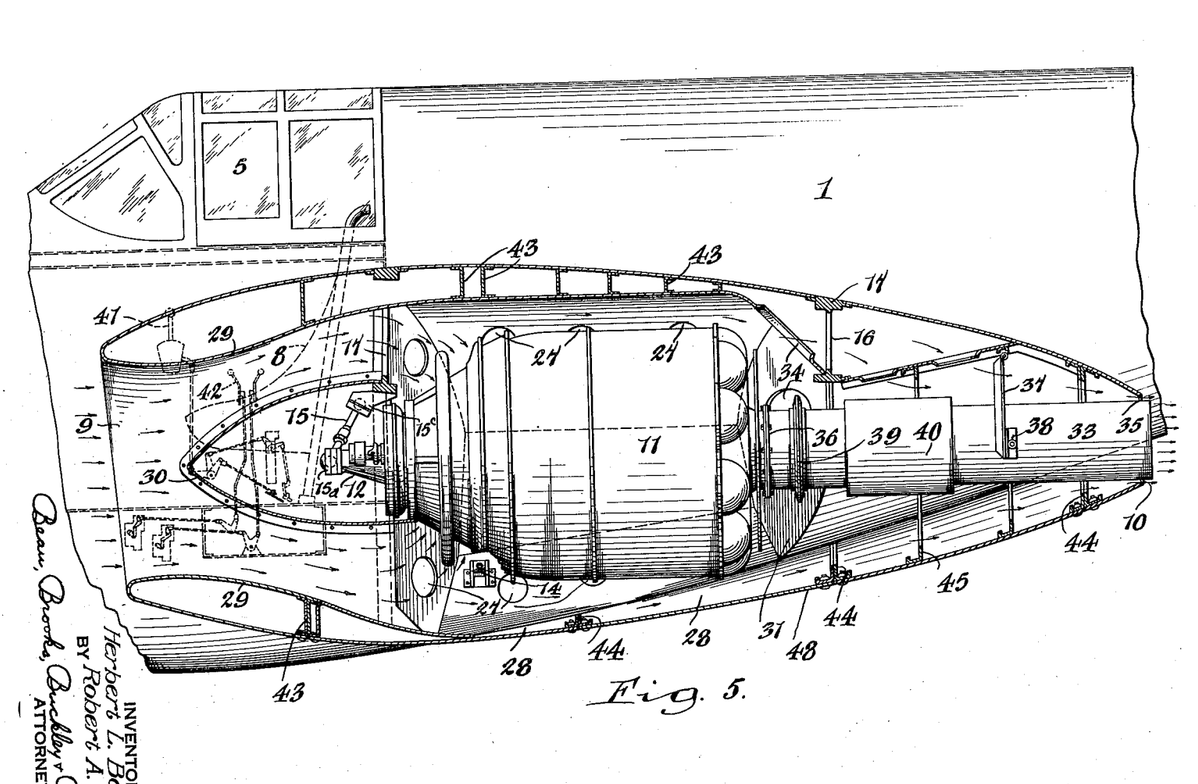
Figure 5 is a fragmentary side view showing in longitudinal section a power unit installation taken along the lines 5—5 in Figure 4.

The nacelles are comprised of an outer wall 28 and an inner wall 29, as seen in Figures 5 and 7. This inner wall 29 is seen in Figures 6 and 7 as extending rearwardly from the induction ports 9 and recessed within the fuselage to the point where the swingable support yokes 37 (later referred to) are installed, and again on the outboard side of each nacelle from the induction port 9 rearwardly about the interior of the power unit nacelle as far aft as the outer wing panel joiner point 22a. It will be readily seen that this inner wall gives structural strength to the induction ports 9 and, likewise, assists in properly and most efficiently directing the inducted air into the power units themselves, as may be seen by the directional arrows within the induction ports in Figure 6. It will likewise be seen that the airflow apertures 27, as seen in Figure 6 are provided for the interchange of air between the two nacelles. The positions of the main structure bulkheads 46—46 are likewise seen at Figures 4 and 6. These bulkheads form the forward and rearward limitations of the unified nacelle structures 7—7. The recessed method of installation is obviously apparent by reference to Figure 7, wherein the normal fuselage line 47 is shown in dot-dash outline.

As seen in Figure 5, an inner cowling 30 is installed over the starter and other accessories grouped at 12 at the forward end of the power unit 11 for protective purposes. This may be made of heavy armor plate for military aircraft. The tail pipe 33 is connected at the rear of the power unit 11 by the joint 36 at which point the inner wall 29 converges, said inner wall having airflow openings 34 suitably positioned therein. The tail pipe opening 10 is at the extreme aft end of the nacelle 7. The tail pipe is rearwardly attached to the inner wall 29 by means of the swingable support yoke 37 and the connection 38. The tail pipe 33 is likewise provided with an expansion joint 39 and a muff 40, from which heat may be carried by means not shown, whenever required in the airplane.

The relative position of the power unit 11 is readily seen in Figure 5 as slightly outboard and aft of the pilot's seat 8, near which are conveniently located a throttle 41, together with the fuel valve or other controls 42. These operate a conventional system of push-pull rods and bell cranks.

Referring to Figure 5, it will be seen that the inner and outer walls of the power unit nacelle are separated by structural channels 43. Chord member 17 of the front and rear beams are seen in cross section. Likewise are indicated the formers 44 and other structural supports 45, all of which are jointed to the nacelle skin in pressure sealed relation.

For purposes of general operational information, it will be noted that the air is taken in through the induction port 9, the flow being guided about and between the inner cowling 30 and the inner walls 29 of the nacelle to the suction ports in the power units, which are not indicated, but positioned at the forward part of the power units 11. By operation of the power units the propelling jets are vented through the tail pipe openings 35—35.

Power unit cooling and airflow balance about and between the two power units 11 is accomplished by the unique and novel use of the nacelle construction and as indicated by the arrows in Figure 6. Some of the inducted air is by-passed rearwardly of the bulkheads 31 over and along the power units to the area between the nacelle walls and the tail pipe 23 where it passes into the atmosphere through openings 35 immediately adjacent to the tail pipe opening 10. A considerable portion of air is also by-passed over and about the power units 11 to the inboard inner walls 29 of both nacelles which have airflow apertures 27 permitting free exchange and balance of air between the two nacelles with an ultimate rearward flow about the power units 11 to the structural openings 34 where an additional interchange of airflow may occur prior to the emission of the air immediately adjacent to the tail pipe openings 35.

Figure 8:
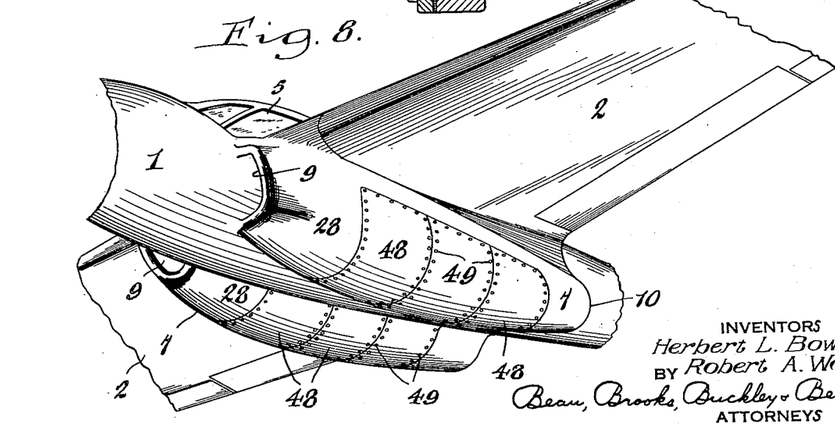
Figure 8 is a perspective underside view of the center section of the airplane described in Figures 2 and 3.

The outer walls 28 of the nacelles 7 are described in Figure 8 as bearing access plates 48 which are held in place by fasteners 49. Accordingly, repairs on the power units 11 may be made with extreme ease.

Figures 9, 10:
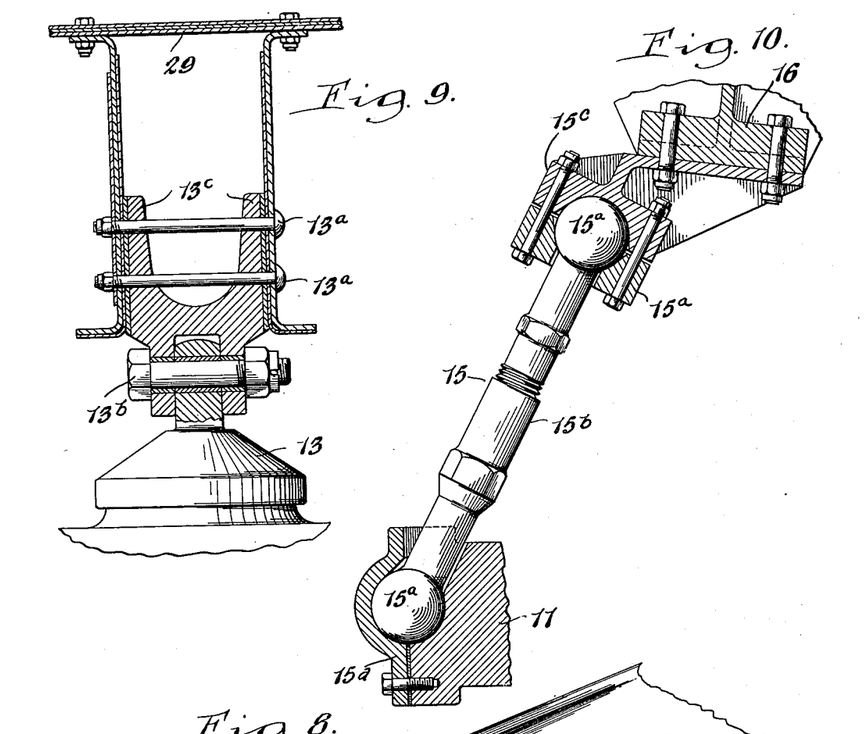
Figure 9 is a detail of one of the power unit's rear supports.
Figure 10 is a detail of one of the power unit's forward supports.

Referring again to the power unit upper support fitting 13, it will be noted in the enlargement described in Figure 9 that same is attached to the fuselage by means of the bolts 13a and to the engine by the engine bolt 13b. A shim is provided at each side of the fitting 13c permitting easy change in the alignment of the power unit, relative to the structure itself.

Figure 10 shows an enlargement of the forward adjustable support member 15, which holds the power unit to the fuselage by means of two ball and socket arrangements 15a. These, in turn, are connected by means of a threaded section 15b. The threaded section permits simple adjustment of the alignment of the forward part of the power unit and the ball and socket arrangements permit freedom of movement during the period of adjustment. The upper portion of the fitting 15c is attached to the center section beam 16 and the lower portion to the power unit 11 by the lower fitting 15d.

Figure 11:
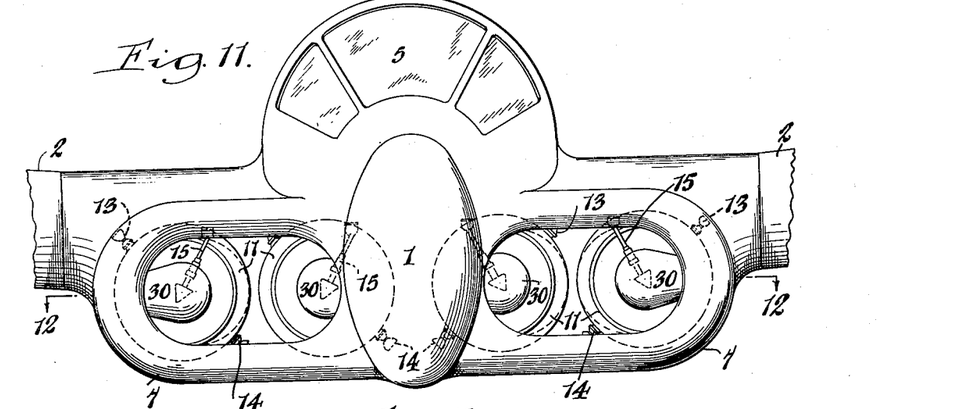
Figure 11 is a diagrammatic view in front elevation of the center section of an airplane having an arrangement of four power units of the type described, installed in accordance with this invention.

In Figure 11 we have described a front elevational view of an adaptation of this invention wherein four power units of the jet propulsion type might be installed in the same advantageous and effective manner as heretofore described for two such units. Here each nacelle 7 encloses two power units with the two inboard units mounted in the recessed portion of the fuselage, in virtually the same manner as heretofore described with respect to the two-power-unit embodiment. The four power units in Figure 11 are supported within the nacelles by the same type of upper and lower fittings 13 and 14, respectively, and forward adjustable supports 15. In this adaptation the nacelles are likewise joined into one structural unit at the center section of the airplane and in suitable manner to the main support girder of the center section, with the result that all of the weight and moment of inertia factors previously described apply with equal efficiency in this instance.

Figure 12:
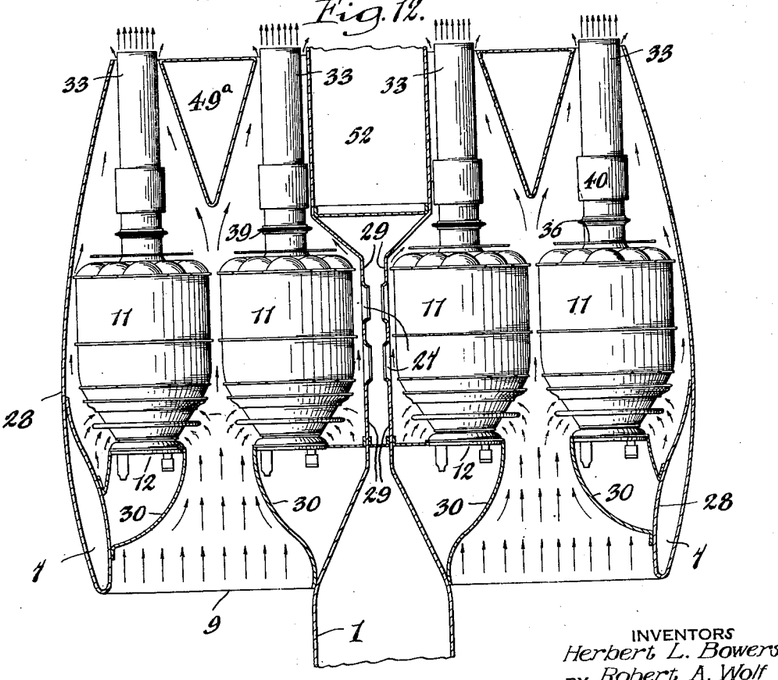
Figure 12 is a transverse section of the power unit installation along the line 12—12, as seen in Figure 11.

Figure 12 discloses, transversely a method of four-power-unit installation. Nacelles may have one induction port 9 each. In this modification the nacelles 7 would likewise be built of outer and inner walls 28 and 29. The method of air intake and airflow is readily indicated by the arrows. Inner cowlings 30 would likewise be built in proper relationship for the protection of the various operation accessories. At the rear of the nacelles the individual power units 11 may have individual tail pipes 33 between which a structural strengthener 49a might be placed.

Thus, it will be understood that the airplane arrangement of the invention embodies a structure which is based primarily upon the wing frame and includes a plurality of reaction-jet propulsion units grouped in side-by-side relation in close proximity to the thrust axis of the airplane and enclosed by cowling structures which conform closely to the sectional shapes of the power units in the regions thereof and extend forwardly thereof to provide open ended air intake chambers ahead of said units. The power units and cowling structures are partially submerged within the wing contour; and it will be understood that through use of a plurality of power units of relatively small sectional dimensions in lieu of a lesser number of power units of larger sectional dimensions, an airplane incorporating greater total power and lesser total frontal area is provided.

The pilot cockpit and ordnance-carrying nacelle and empennage structures of the airplane are all based upon the central wing and power unit structures; and location of the relatively heavy masses of the airplane structure in the approximate region of the center of gravity of the complete aircraft is thereby facilitated. Also due to the fact that the discharge jets of the power units are thereby disposed to be closely grouped in the region of the thrust axis of the airplane, yaw and pitch control of the airplane is facilitated. In this respect the beneficial result so obtained is substantially equal to the directional stability results to be obtained through employment of a single power unit having its discharge jet upon the thrust axis of the airplane; but it will be appreciated that by reason of the arrangement of the present invention the large bulk attendant to use of a single power unit is avoided.

Furthermore, by reason of the side-by-side and nested arrangement of the plural power units of the invention a space between and above the power units is inherently provided for effective reception of the passenger compartment of the airplane. As a consequence the passenger cockpit may be arranged to be nested substantially between the power units, thereby avoiding undue projection of the passenger compartment above the wing beyond the extent required for good visibility; and consequently further economy with respect to total frontal area of the aircraft is effected. Similarly, the arrangement illustrated in Figs. 11 and 12 of the drawing provides many important practical features and advantages because it enables the use of power units which are relatively small compared to the total dimensions of the airplane and which are adapted to be substantially nested within the wing contour and to project therebelow to only slight degrees. The cowling structures enclosing the power units are thereby enabled to be compactly formed so as to effectively enclose the power units while directing the flow of air thereover as required without contributing substantially to increase of the total frontal area of the airplane.

Another feature of the arrangement is that in each instance although the cowl enclosing the jet propulsion unit is generally of cylindrical form it is somewhat streamlined longitudinally and so arranged relative to the airplane wing so as to merge into the sectional profile form thereof along the upper surface of the wing, while the jet discharge pipe of the power unit is directed rearwardly and substantially parallel to the plane of the wing chord. Consequently, when the airplane is in flight the axis of the jet discharge pipe is disposed substantially parallel to the horizontal plane of the line of flight, and the upswept form of the empennage supporting portion of the fuselage disposes the tail structure of the airplane clear of the path of the hot jet gases. It is obvious that there may be variations and alterations in the structures described, without departing from the spirit or scope of the invention herein described.

What is claimed is:

1. In an airplane of the jet propulsion type comprising a body having a frame section composed of girders, chord members, diagonal and vertical braces, jet power units on each side of the body in juxtaposed relationship thereto, nacelles enclosing the power units in spaced relationship thereto and substantially co-extensive therewith, each of the nacelles having one part extending around portions of each of the power units and each end of the part being connected to each end of the frame section, each of the nacelles having other parts with one end of each of the parts being connected to the opposite ends of the frame section adjacent the points of connection of the first mentioned part and extending around major portions of each of the power units to a point substantially medially of the first mentioned part and connected thereto with the ends of the second mentioned parts being in spaced relationship, reinforcing members mounted between the spaced ends and connected thereto, and brace members connected to the power units and to each side of the reinforcing members and adjacent the ends of the second mentioned parts.

2. The structure as claimed in claim 1 with other brace members affixed to the frame section and the power unit at a point approximately diametrically opposite the first brace members, and adjustable braces mounted between the forepart of the power units and frame section.

HERBERT L. BOWERS.
ROBERT A. WOLF.

REFERENCES CITED

The following references are of record in the file of this patent:

UNITED STATES PATENTS

| Number | Name | Date |
|---|---|---|
| D. 144,933 | Poyer | June 4, 1946 |
| 2,140,783 | Bellanca | Dec. 20, 1938 |
| 2,283,863 | Achterman | May 19, 1942 |
| 2,405,723 | Way | Aug. 13, 1946 |
| 2,420,323 | Meyer | May 13, 1947 |

FOREIGN PATENTS

| Number | Country | Date |
|---|---|---|
| 518,663 | Great Britain | Mar. 5, 1940 |